(12) United States Patent
Silvestrini et al.

(10) Patent No.: US 12,472,880 B2
(45) Date of Patent: Nov. 18, 2025

(54) ADJUSTABLE SUPPORT FOR ATTACHING ELECTRONIC AND/OR MECHANICAL COMPONENTS TO A WINDSHIELD OF A VEHICLE

(71) Applicant: SAINT-GOBAIN GLASS FRANCE, Courbevoie (FR)

(72) Inventors: Laurent Silvestrini, Bussy (FR); Mickaël Bonhomme, Le Plessis-Brion (FR); Justine Seeley, Paris (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 0 days.

(21) Appl. No.: 18/569,008

(22) PCT Filed: Jun. 9, 2022

(86) PCT No.: PCT/EP2022/065749
§ 371 (c)(1),
(2) Date: Dec. 11, 2023

(87) PCT Pub. No.: WO2022/258776
PCT Pub. Date: Dec. 15, 2022

(65) Prior Publication Data
US 2024/0278731 A1    Aug. 22, 2024

(30) Foreign Application Priority Data
Jun. 11, 2021   (FR) ...................................... 2106168

(51) Int. Cl.
*B60R 11/00*    (2006.01)
(52) U.S. Cl.
CPC ....... *B60R 11/00* (2013.01); *B60R 2011/0026* (2013.01); *B60R 2011/0085* (2013.01)

(58) Field of Classification Search
CPC ............ B60R 11/00; B60R 2011/0026; B60R 2011/0085; B60R 2011/0042; B60R 2011/0094; B60R 11/04
(Continued)

(56) References Cited

U.S. PATENT DOCUMENTS 9,120,438 B2 *  9/2015  Richter ................ F16M 13/022
9,908,481 B2 *  3/2018  Hayashi .................. B60R 11/04
(Continued)

FOREIGN PATENT DOCUMENTS

DE         103 54 458 A1    6/2005
DE      10 2010 008215 A1    9/2010
(Continued)

OTHER PUBLICATIONS

International Search Report as issued in International Patent Application No. PCT/EP2022/065749, dated Sep. 15, 2022.

*Primary Examiner* — Christopher Garft
(74) *Attorney, Agent, or Firm* — Pillsbury Winthrop Shaw Pittman LLP

(57) ABSTRACT

An adjustable support for attaching electronic and/or mechanical components to a windshield of a vehicle. The adjustable support includes a first support element, a second support element and a cover for protecting the first and second support elements. The first support element is intended to be attached to a windshield. The second support element is connected to the first support element by a hinge to allow the rotation of the second support element relative to the first support element. The protective cover and the second support element respectively include a complementary junction device so that, when the protective cover is attached to the first and second support elements, these (Continued)

junction devices make it possible to form a relative angle of inclination between the second support element and the first support element.

12 Claims, 3 Drawing Sheets

(58) Field of Classification Search
USPC .......................................... 248/274.1; 348/148
See application file for complete search history.

(56) References Cited

U.S. PATENT DOCUMENTS

| | | | |
|---|---|---|---|
| 10,459,319 B2* | 10/2019 | Kasai | G03B 17/561 |
| 11,203,297 B2* | 12/2021 | Held | B60R 11/02 |
| 11,203,306 B2* | 12/2021 | Hodge | B60R 11/04 |
| 11,590,894 B2* | 2/2023 | Kahrens | B60R 1/04 |
| 11,851,008 B2* | 12/2023 | Miller | B60R 11/04 |
| 2011/0220697 A1* | 9/2011 | Luk | B60R 11/0258 |
| | | | 224/567 |
| 2024/0067103 A1* | 2/2024 | Iverson | B60R 11/0241 |
| 2024/0278731 A1* | 8/2024 | Silvestrini | B60R 11/04 |

FOREIGN PATENT DOCUMENTS

| | | |
|---|---|---|
| EP | 2 979 929 A1 | 2/2016 |
| WO | WO 2013/070158 A1 | 5/2013 |

* cited by examiner

ADJUSTABLE SUPPORT FOR ATTACHING ELECTRONIC AND/OR MECHANICAL COMPONENTS TO A WINDSHIELD OF A VEHICLE

CROSS-REFERENCE TO RELATED APPLICATIONS

This application is the U.S. National Stage of PCT/EP2022/065749, filed Jun. 9, 2022, which in turn claims priority to French patent application number 2106168 filed Jun. 11, 2021. The content of these applications are incorporated herein by reference in their entireties.

TECHNICAL FIELD

The invention relates to an adjustable support for attaching electronic and/or mechanical components to a windshield of a vehicle.

TECHNICAL BACKGROUND

It is common in the automotive industry to use windshield supports for attaching mechanical and/or electronic components, such as sensors and/or cameras, to the windshield of a vehicle. The design of these supports varies according to the shape, position, and orientation angle of the windshield on which they are mounted, as well as according to the technical requirements of the mechanical and/or electronic components that they support.

These attachment supports are generally adjustable so as to be able to adapt them more easily to the different windshield configurations and/or to the various types of mechanical and/or electronic components. This adjustable character in particular allows a certain freedom in the angle of inclination of the mechanical and/or electronic components relative to the windshield so that these components can be oriented according to the prescribed angle for their correct operation.

For example, in a motor vehicle, for optimal operation of a driving assistance system attached to a windshield and comprising a camera and/or a sensor, this camera and/or this sensor may have to be arranged along a horizontal axis relative to the vehicle's chassis.

Windshields generally have a certain inclination relative to the chassis, so it may then be necessary to compensate for this inclination in order to ensure horizontality. The role of angular compensation is generally given to the attachment support. The compensation angle of the support generally depends on the nature, shape, position, and angle of inclination of the windshield relative to the vehicle on which it is assembled.

DE10 2010 008 215 A1 [DAIMLER AG [DE]] 16 Sep. 2010 describes an adjustable support comprising a first element intended to be attached to a windshield, a second movable element connected to the first element in a rotatable manner, and a slide provided with a clamping screw for adjusting the angle of inclination of the second element relative to the first.

WO 2013/070158 A1 [SCANIA CV AB [SE]] 16 May 2013 describes an adjustable support comprising a first element intended to be attached to a windshield, a second movable element connected to the first element in a rotatable manner, a protective cover and shims for adjusting the angle of inclination of the second element relative to the first.

EP 2 979 929 A1 [Continental Automotive GmbH [DE]] 3 Feb. 2016 also describes an adjustable support comprising a first element intended to be attached to a windshield, a second movable element connected to the first element in a rotatable manner, and shims for adjusting the angle of inclination of the second element relative to the first.

SUMMARY OF THE INVENTION

Technical Problem

A first drawback of the adjustable supports of the state of the art is that the angle of inclination can only be fixed by means of shims or slides which offer only a relatively limited freedom as to the choice of this angle. Indeed, the minimum or maximum angle of inclination that can be reached depends on the minimum or maximum available travel of the shims or slides. However, there may be a need for further adaptive support, in particular concerning the value of the angle of inclination.

A second drawback is that the shims or the slides are additional elements of the supports. However, it may be advantageous, in terms of manufacturing, to have a simpler support solution, especially with fewer elements involved in their assembly and functionalities.

Solution to the Technical Problem

An adjustable support is provided for a windshield as described in claim 1, the dependent claims being advantageous embodiments.

Advantages of the Invention

A first advantage of the invention is a simpler adjustable support allowing a broader choice of angle of inclination. Since the angle of inclination of the support is adjusted by virtue of a mechanical link between an element of the support and the protective cover, a greater freedom of inclination of the support relative to the windshield is allowed to be used, in particular by the design of the protective cover. In one sense, the support according to the invention has more optimal adaptability compared to the supports available in the state of the art.

A second advantage is that the manufacture and packaging of the support are simplified. In particular, during packaging, the first and second elements of the support can be arranged so that they ensure a very small geometric bulk, in particular planar. A larger number of supports can then be packaged in the same space for their storage and transport.

A third advantage is that the attachment support makes it possible to significantly reduce the number of parts required for manufacturing. In particular, according to certain embodiments, the support may require only the manufacture of two parts, the two support elements on the one hand, and the protective cover on the other hand.

DETAILED DESCRIPTION OF EMBODIMENTS

Figure 1:
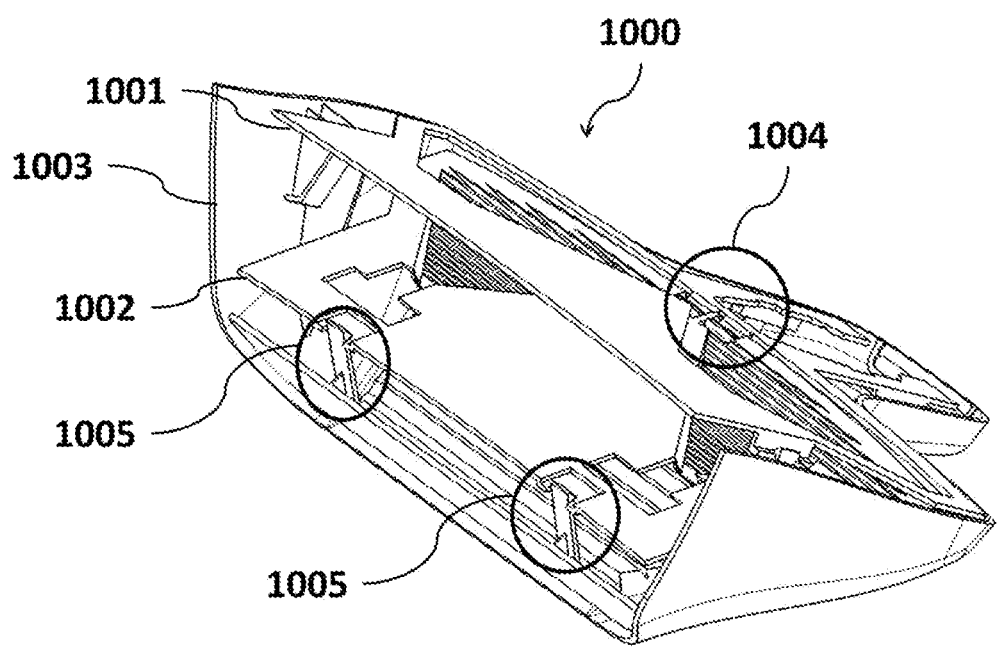
FIG. 1 is a schematic orthogonal projection of an adjustable support according to one embodiment.
Figure 2:
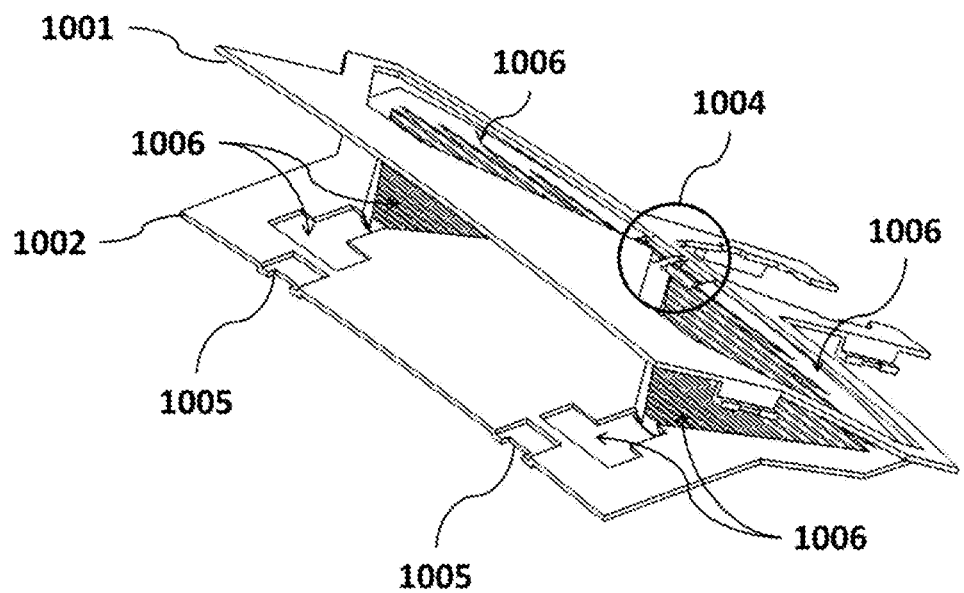
FIG. 2 is a schematic orthogonal projection of the first and second elements of an adjustable support according to one embodiment.
Figure 3:
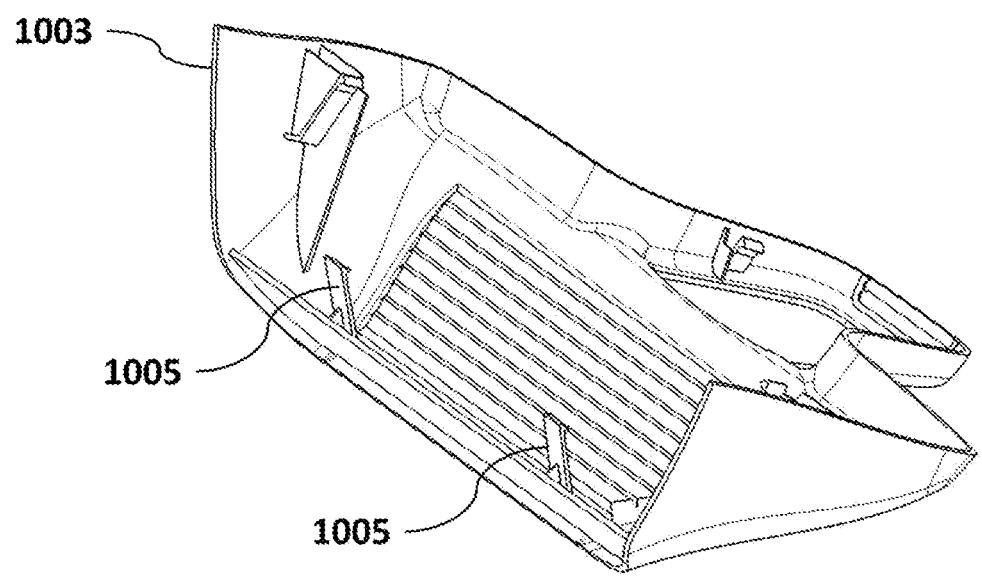
FIG. 3 is a schematic orthogonal projection of a protective cover of an adjustable support according to one embodiment.
Figure 4:
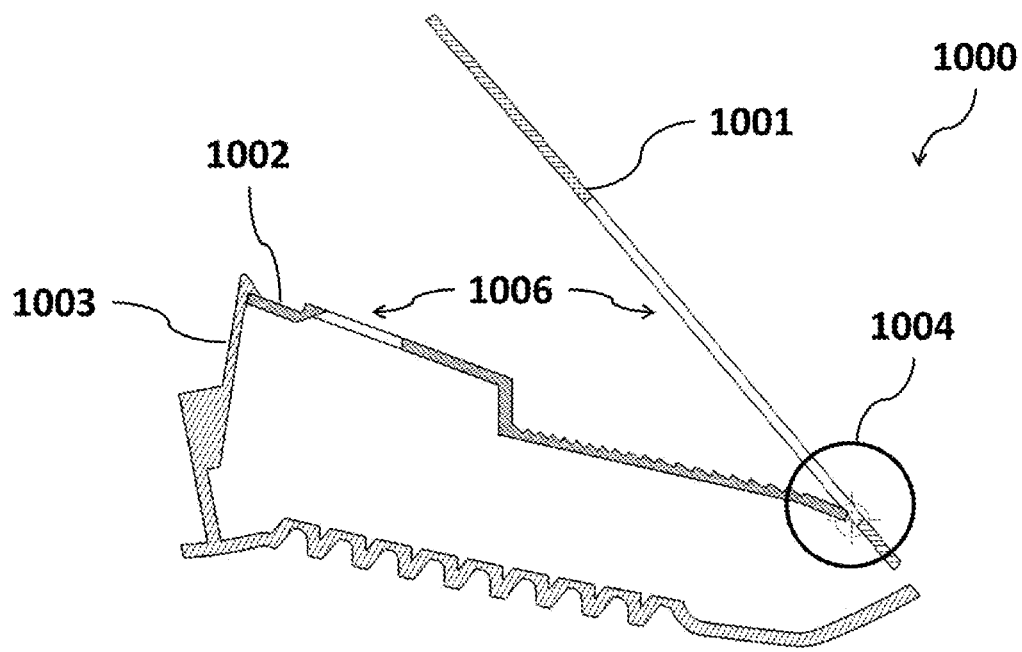
FIG. 4 is a cross-sectional schematic representation of the adjustable support of FIG. 1.

Referring to FIGS. 1 to 4, in one embodiment, an adjustable support 1000 is provided for attaching electronic and/or mechanical components to a windshield of a vehicle. The adjustable support 1000 comprises:
- a first support element 1001;
- a second support element 1002;
- a cover 1003 for protecting the first and second support elements 1001, 1002; wherein
- the first support element 1001 is fixed,
- the second support element 1002 is connected to the first support element 1001 by means of a hinge 1004 configured so as to allow the rotation of the second support element 1002 relative to the first support element 1001;
- the protective cover 1003 and the second support element 1002 respectively comprise complementary junction means 1005 so that, when the protective cover 1003 is attached to the first and second support elements 1001, 1002, these junction means 1005 make it possible to form a relative angle of inclination between the second support element 1002 and the first support element 1001.

The first and second support elements 1001, 1002, as well as the protective cover 1003, can be made of any suitable material. In particular, they may be based on thermoplastic material, such as PVC, PC, PA66 and/or ABS with any fillers. The use of thermoplastic material has the advantage of allowing the manufacture of all or part of the support using injection molding processes.

According to certain embodiments, the first and second support elements 1001, 1002, as well as the protective cover 1003, may comprise reinforcing or counter-bearing elements (not shown). These reinforcing or counter-bearing elements can advantageously make it possible to improve the mechanical strength and stability of the second support element 1002 against the protective cover 1003 depending on the type of electronic and/or mechanical components that the adjustable support 1000 can house. These reinforcing or counter-bearing elements may be made of plastics and/or metal material.

The first and second support elements 1001, 1002 may comprise design features 1006, such as openings, notches, cutouts, ribs, flocking, texturing, in order to allow, for example, the passage of connectors such as supply cables, and/or signals necessary for the operation of said components.

Within the meaning of the invention, "hinge" 1004 is understood to mean any suitable mechanical means enabling the rotation of the second support element relative to the first support element. By way of example, such means can be a central articulation in the form of a set of male-female movable plugs, as shown in the figure, or it may be a rotary shaft formed by a system of pivots, which are optionally clippable, arranged facing one another as described in DE10 2010 008 215 A1, WO 2013/070158 A or EP 2 979 929 A1. Other hinge forms are possible, in particular those described below in certain advantageous embodiments of the invention.

Within the meaning of the invention, "protective cover" 1003 is understood to mean any cover that ensures a certain protection of the electronic and/or mechanical components that the adjustable support is capable of housing against the external environment. It may also have a function of concealing said components from the view of the driver and passengers of a vehicle and/or an aesthetic function, in particular by its shape, surface texture and/or color. The cover may be a full cover, that is completely closed. It may also comprise open parts.

According to the invention, the protective cover 1003 and the second support element 1002 respectively comprise complementary junction means 1005 so that, when the protective cover 1003 is attached to the first and second support elements 1001, 1002, these junction means 1005 make it possible to form a relative angle of inclination between the second support element 1002 and the first support element 1001.

These junction means 1005 can be arranged in any way adapted to form said relative inclination angle. They may preferably be arranged on the surfaces of the protective cover 1003 and the second support element 1002, respectively opposite one another, as shown in particular in the figures. They can also be arranged on the periphery of the second support element and on the lateral surfaces of the protective cover.

According to certain embodiments, as shown in the figures, the relative inclination angle can be defined by the arrangement of the complementary junction means 1005. A particular arrangement may especially be obtained by an appropriate choice of the size and shape of the junction means 1005. These junction means 1005 can then form said relative inclination angle independently of the angle formed between, on the one hand, the surface of the protective cover 1003 located opposite the first support element 1001 and, on the other hand, said first support element 1001.

According to other embodiments, the relative inclination angle can be defined by the angle of inclination between the inner surface of the protective cover 1003 and the first support element 1001. These embodiments are particularly advantageous in that they make it possible to use the first support element 1001, the second support element 1002 and the hinge 1004 with a very large variety of protective covers. These protective covers need only be suitable as regards their design at the desired angle of inclination. In other words, a first support element 1001, a second support element 1002 and a hinge 1004 can be designed generically in order to offer advantageous ease of reuse in several applications requiring different angles of inclination, the protective cover being suitable for each application.

According to advantageous embodiments, the complementary junction means 1005 can be removable means. Removable means can facilitate the removal of the protective cover 1003, in particular when it is necessary to change a part of the support, such as the cover itself and/or another element of the support, and/or one or more electronic and/or mechanical components that it is able to house.

According to certain embodiments, the junction means 1005 may be a male-female connector. As examples of male-female connectors, mention may be made of screw and bolt assemblies, male and female plug assemblies, dovetails and mortises, assembly clips, hook and eye assemblies. Preferably, the male-female connector can form a snap-on attachment, as shown in the figure. A snap-on attachment makes it possible, depending on its configuration, to obtain a definitive or removable attachment.

Figure 5:
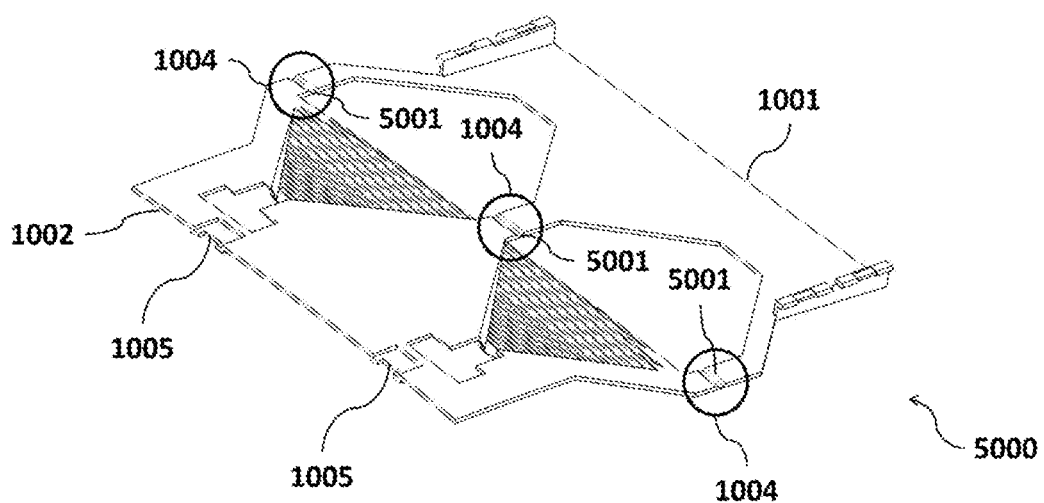
FIG. 5 is a schematic orthogonal projection, in a folded-out position, of the first and second elements of an adjustable support according to another embodiment.

According to advantageous embodiments, with reference to FIG. 5, the first support element 1001, the second support element 1002 and the hinge 1004 may be three portions of a single integral part 5000. In other words, the first support element 1001, the second support element 1002 and the hinge 1004 do not form separate parts assembled together, but only one and the same part 5000, the hinge 1004 of which forms an articulation incorporated into the first and second support elements 1001, 1002.

These embodiments confer certain advantages in terms of manufacturing and packaging of the adjustable attachment supports 1000 according to the invention. The adjustable support 1000 may only require the manufacture of two parts: the two support elements 1001, 1002 on the one hand, and the protective cover 1003 on the other hand, while conventional attachment supports require the manufacture and complex assembly of a larger number of parts.

As for packaging for storage and transportation purposes, the fact that the first support element 1001, the second support element 1002 and the hinge 1004 form only one single integral part 5000 makes it possible to reduce the geometric bulk thereof, in particular by making it possible to have a substantially planar part when the first and second elements 1001, 1002 are folded together or are completely unfolded. A larger number of adjustable attachment supports 1000 can then be packaged in the same space.

It is also notable that the assembly of the adjustable attachment support 1000 is considerably simplified because the attachment supports of the prior art require the assembly of several parts, in particular more than three, whereas the embodiments described above require the assembly of only two parts.

According to preferred embodiments, the single integral part is a part made of thermoplastic material and the hinge 1004 is formed by a flexible junction zone 5001 of said single integral part located between the parts of said single integral part forming the first and second support elements 1001, 1002. By way of example, the flexible junction zone 5001 can be obtained by thinning in the thickness of the part in said junction zone. The thinning can also advantageously be such that two bevels are formed opposite one another so as to allow the folding of the two parts corresponding to the first and second elements of the support towards each other, as illustrated in FIG. 5.

According to the invention, the first support element 1001 is fixed. In particular, the first support element 1001 can be intended to be attached to a surface, in particular to the surface of a windshield. In advantageous embodiments, the first support element 1001 may have a form making it possible to match the curvature of the windshield, windshields generally having a certain curvature.

In some embodiments, the adjustable attachment support 1000 may further comprise inclination reinforcing shims (not shown) between the first support element 1001 and the second support element 1002. Examples of reinforcing shim are described in applications DE10 2010 008 215 A1, WO 2013/070158 A or EP 2 979 929 A1. It should be noted that these reinforcement shims are not necessary for the implementation of the attachment support according to the invention. They are optional. They may be useful in certain applications when mechanical reinforcement for maintaining the angle of inclination is desired.

The adjustable attachment support 1000 according to any of the embodiments described can be used for attaching electronic and/or mechanical components to a windshield of a vehicle, in particular a motor vehicle.

The invention claimed is:

1. An adjustable support for attaching electronic and/or mechanical components to a windshield of a vehicle, said adjustable support comprising:
   a first support element;
   a movable second support element that is movable relative to the first support element;
   a protective cover for protecting the first support element and the movable second support element;
   wherein
   the first support element is adapted to be attached to a windshield,
   the movable second support element is connected to the first support element by a hinge configured so as to allow a rotation of the movable second support element relative to the first support element;
   the protective cover and the movable second support element respectively comprise a complementary junction device to connect the protective cover to the movable second support element and secure in position the movable second support element relative to the protective cover when the protective cover is attached to first support element so that, when the protective cover is attached to the first and second support elements, said junction device makes it possible to form a relative angle of inclination between the second support element and the first support element.

2. The support according to claim 1, wherein the relative angle of inclination is defined by the arrangement of the complementary junction device.

3. The support according to claim 1, wherein the relative angle of inclination is defined by an angle of inclination between an inner surface of the protective cover and the first support element.

4. The support according to claim 1, wherein the complementary junction device is removable.

5. The support according to claim 1, wherein the junction device is a male-female connector.

6. The support according to claim 5, wherein the male-female connector forms a snap-on attachment.

7. The support according to claim 1, wherein the first support element, the movable second support element and the hinge are three portions of a single integral part.

8. The support according to claim 7, wherein the single integral part is a part made of thermoplastic material and the hinge is formed by a flexible junction zone of said single integral part located between the portions of said single integral part forming the first support element and the movable second support element.

9. The support according to claim 1, wherein the first support element is adapted to be attached to a surface of the windshield.

10. A method comprising providing an adjustable support according to claim 1 for attaching the electronic and/or mechanical components to the windshield of a vehicle.

11. The method according to claim 10, wherein the vehicle is a motor vehicle.

12. The support according to claim 1, wherein the junction device makes it possible to form the relative angle of inclination between the second support element and the first support element independently of an angle formed between a surface of the protective cover located opposite the first support element and the first support element.

* * * * *